United States Patent Office 2,851,423
Patented Sept. 9, 1958

2,851,423

FLUORESCENT COMPOSITIONS

Thomas Norman Gaunt, Birkenshaw, near Bradford, England, assignor, by mesne assignments, to Switzer Brothers, Inc., Cleveland, Ohio, a corporation of Ohio No Drawing. Application March 31, 1954
Serial No. 420,193

Claims priority, application Great Britain August 17, 1951

9 Claims. (Cl. 252—301.2)

The present invention relates to fluorescent compositions and particularly to fluorescent coating compositions such as printing pastes, printing inks, silk screen inks, textile inks, and the like.

At the present time, various fluorescent coating compositions are known which are not only black light fluorescent but are also daylight fluorescent. Many of these compositions have a very serious disadvantage when in use since they have very poor light-stability and soon fade or change color, particularly when they are in the form of finely-divided pigment and are applied in very thin layers, as, for example, by impress methods. Some of these compositions which contain a rhodamine dyed pigment and exhibit a bluish-red color have proven satisfactory, both as to light-stability or color life and also as to the desired intensity and brilliancy of color characteristic of daylight fluorescence, even when applied in thin layers in a finely-divided state. However, certain other colors, notably those which contain a yellow component such as red, red-orange, orange and yellow-orange, have not proven satisfactory as to light stability under such conditions. These yellow-containing colors either lack the intensity and brilliancy characteristic of daylight fluorescent colors altogether, or, when such intensity is present initially, the light-stability is so poor that the color fades or changes in a short space of time.

In the past, daylight fluorescent colors exhibiting a yellow hue were generally prepared from such yellow fluorescent dyes as brilliant sulfoflavine FF, thioflavine and the like. These dyes and other known yellow fluorescent dyes were usually employed in pigment form by incorporating the dye, in a solvated or dissolved state, in a substrata, such as solid resinous particles of pigment size. A similar technique was employed in making the other colored fluorescent pigments. For example, various bluish red pigments were prepared by incorporating one or more of the rhodamine dyes in solid resinous particles.

Frequently, it is desired to prepare a coloring material having an intense brilliant daylight fluorescent non-bluish-red, orange or yellow-orange color. Such colors are normally obtained by mixing together the bluish-red and yellow pigments, as mentioned above. However, it was found that when a finely-divided rhodamine dyed pigment and a finely-divided fluorescent yellow dyed pigment, such as a flavine pigment, were mechanically mixed and incorporated in a vehicle, the resulting color, when applied in thin layers, even initially did not possess the intense brilliancy characteristic of good daylight fluorescent colors; but rather, the color was dull and lifeless. Furthermore, even the dull orange color changed in a short time due to the rapid fading of the yellow dyed pigment.

Attempts were made to overcome these disadvantages, and it was found that if a single dyed pigment, in finely-divided form, were prepared by combining both the rhodamine dye and the yellow dye in the pigment particles, such pigment did possess an initial intensity and brilliancy characteristic of daylight fluorescent colors, even in thin layers; but the light-stability remained poor, and in a short time the yellow color faded out, thus changing the color. The light-stability of such pigments containing both dyes could only be improved by using carefully selected resinous substrata and in using relatively large particle size, which, in turn, precluded the application in thin layers.

For purposes of the present invention, the relative quality of light-stability or light-fastness is based on weatherometer tests in which two hours' exposure is normally the equivalent of one day in a sunny climate. Whenever reference is made to poor light-stability or fastness, it shall mean that the specimen coating either fades appreciably or darkens after five hours or less in the weatherometer. On the other hand, if after forty hours in the weatherometer there is not more than a slight fading or change of color, the specimen is said to have very good light stability and is said to be semi-permanent. When a specimen coating or print exhibits substantially no change in color after sixty hours in the weatherometer, it is said to have excellent light-stability and is said to be quite permanent.

It has now been discovered that when 2,2' dihydroxy naphthaldazine, or derivatives thereof such as the alkyl or halogen substituted 2,2' dihydroxy naphthaldazine are employed in place of the yellow dyed pigments, several important advantages are obtained. When this particular yellow pigment, in fine particle size, is mechanically mixed with a finely-divided rhodamine dyed pigment in such proportions as to form the desired shade of fluorescent orange and is then dispersed in a suitable vehicle, not only do thin layers of this coating composition have a greatly improved light-stability, but, unlike the mechanical mixture of the yellow dyed and red dyed pigments, the color is intensely brilliant and daylight fluorescent. The two different pigments are not only each daylight fluorescent, but the colors appear to cascade, i. e., mutually enhance the brilliancy of each other.

As stated above, the combination of the naphthaldazine yellow pigment and rhodamine dyed pigment produces a color effect which is more intense and brilliant than would be expected by the simple addition of the two separate color effects. When thin printed films containing the combination of the pigments are exposed to daylight, the naphthaldazine pigment appears to act as a filter by absorbing ultraviolet and blue wavelengths, which might otherwise cause photodecomposition of the rhodamine dye, and by converting these absorbed wavelengths into green wavelengths, which, in turn, are converted by the rhodamine into red wavelengths. Thus, the red fluorescent brightness is enhanced by the double conversion of wave lengths. The yellow pigment also converts the blue wavelengths normally emitted by the rhodamine dye to green, which is also changed to the red wavelengths. This last factor is utilized in producing intensely non-bluish-red color effects, as described below.

As evidenced by fadeometer tests, the naphthaldazine appears to have a stabilizing effect on the rhodamine dye since the combination of pigments is far more light-fast than either of the pigments when tested singly in the fadeometer.

Another advantage obtained by using the combination of the dihydroxy naphthaldazine with the rhodamine dyed pigments occurs when only relatively small quantities of the yellow pigment are used. As is known, the rhodamine dyes normally exhibit a bluish-red color, i. e., a cerise or magenta, and do not exhibit a pure red. When the yellow pigment of the present invention is added in small quantities, the pigment imparts at most only a small component of yellow color to the coating composition, but it has the very noticeable effect of counteracting substantially to the point of eliminating the bluish color of the rhodamine pigment, thus acting as an anti-blue factor and producing a substantially pure light-stable red fluorescent color of intense brilliance even when in thin layers, which has not been possible heretofore.

Coating compositions containing the combination of the dihydroxy naphthaldazine and the rhodamine dyed pigment have a remarkable light-stability and are classified as better than semi-permanent by the above definition. For example, a printing ink prepared according to Examples 4 or 5, described hereinafter, was tested in a weatherometer, and, after a very slight darkening in the first two hours, the color showed no detectable change in the full test period of 65 hours. The initial darkening referred to could only be noticed if a direct side-by-side comparison were made with a fresh specimen. When viewed alone, no change in color could be detected by the human eye, even after the 65-hour test period. This period would be equivalent to 780 hours in bright sunlight or at least 32.5 days in a sunny location. This color life far exceeds any orange daylight fluorescent color which had been employed heretofore in fine particle size in thin layers. Prior to the present invention, orange daylight fluorescent colors changed color to a very undesirable extent after only 5 hours in the weatherometer.

The yellow pigment employed in the present invention, i. e., 2,2' dihydroxy naphthaldazine or derivatives thereof, may be prepared by reacting 2-hydroxy naphthaldehyde with hydrazine sulfate in methanol solution according to the following mechanism:

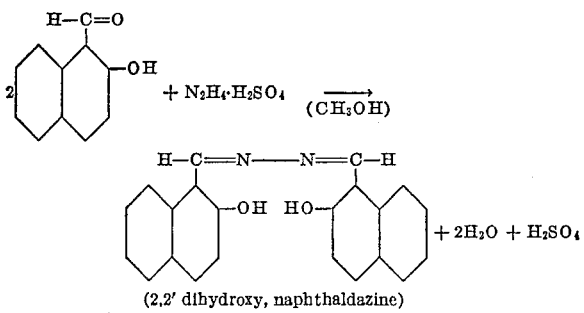

(2,2' dihydroxy, naphthaldazine)

The yellow pigment of the present invention is a crystalline translucent material and is substantially insoluble in all vehicles commonly used in the preparation of coating compositions. Furthermore, the pigment is friable and thus is capable of being ground to extremely small particle size, thus making it admirably suited for use in various printing inks where very fine particle size is essential.

In general, the quantity of the dihydroxy naphthaldazine used may vary within substantial limits. For example, when it is desired to eliminate the bluish tinge which accompanies the rhodamine dyes, one should use approximately 3 or 4 parts by weight of the yellow pigment to 1 part of the rhodamine dye. On the other hand, when an intense yellowish orange is desired, as much as 30 or 35 parts by weight of the yellow pigment should be used with 1 part of the rhodamine dye. If the rhodamine dye is contained in a resinous substrata in a concentration of 3%, then the ratio of the yellow pigment to the rhodamine dyed pigment for use as an anti-blue factor would be between about 1 to 8 and 1 to 12 parts by weight. Similarly, when an intense yellowish orange is desired, the pigment ratio should be between about 1 to 1 and about 1 to 0.9. Obviously, pigment ratios between 1 to 12 and 1 to 0.9 may be used, depending on the shade of color desired. It will be understood, of course, that pigments containing more or less than 3% rhodamine dye can also be used.

Another advantage of using the dihydroxy naphthaldazine pigment is that, when desired, from about 30% up to about 60% total pigment may be used in a printing ink, thus producing better covering power. The naphthaldazine pigment absorbs little of the vehicle and thus the ink will remain fluid, even when a relatively large proportion of the pigment is used, while similar large proportions of various other pigments absorb so much of the vehicle that a stiff unprintable material results, thus requiring greater relative proportions of the vehicle to maintain fluidity.

The rhodamine dyed pigment may be prepared from various resinous materials such as urea-formaldehyde resin, alkyd resins, polyvinyl chloride resins and polyvinyl benzal resins, and also from such materials as methylene urea and silica. As an example of a substrata which may be used, there is the rhodamine dyed metal resinate pigment prepared as described in my copending applications, Serial Nos. 302,989 (of which this application is a continuation in part) and 395,318, filed August 6, 1952, and November 30, 1953, respectively.

The present invention may be carried out in the following manner, the examples serving to illustrate, not limit, the invention. Obviously, other pigment proportions may be employed in coating compositions having different components and/or different proportions thereof.

*Example 1*

A rhodamine dyed pigment may be prepared as follows:
160 grams of finely ground glyceryl phthalate (acid value 135) is dispersed in 1280 cc. of water at room temperature (about 24° C.). 30 grams of a 28% solution of ammonium hydroxide dissolved in 216 cc. of water is then added slowly, with stirring, to the resin dispersion. A dye solution is prepared by dissolving 2.16 grams of rhodamine B Extra and 2.64 grams of rhodamine 6 GDN Extra in 53 cc. of methyl glycol to which 1 gram of iso-octyl phenyl ether of polyethylene glycol has been added. This solution is then diluted with 430 cc. of water.

When the glyceryl phthalate has completely dissolved in the aqueous ammonia solution, the dye solution and the resin solution are both heated to 55° C. and then mixed together with stirring.

A precipitant solution is prepared by dissolving 51.2 grams of hydrous aluminum sulfate $[Al_2(SO_4)_3 \cdot 18H_2O]$ in 512 cc. of water. This solution is also heated to 55° C.

The aluminum sulfate solution is then added slowly, with agitation, to the combined dye and resin solution to precipitate the finely divided dyed pigment. In order to improve the oil wetting characteristics of the finished pigment, 3.2 grams of a monovalent tertiary amine base, such as heptadecenyl imidazoline, dissolved in 100 cc. of water, is added after precipitation and is thoroughly dispersed therethrough.

The pigment containing 3% dye is then filtered, washed and dried at 50° C. The pigment has a cerise color and is so finely divided as to be suitable for use in printing inks without further subdivision.

*Example 2*

Occasionally it is highly desirable, especially when lighter tints or hues are desired, to use some undyed precipitated resin pigment as an extender in the coating composition.

The clear pigment which actually has a white appearance in the dry state may be prepared as described in Example 1, except that no dye solution is prepared, and, to replace this solution, 480 cc. of water are added to the resin solution so as to maintain the proper dilution. It has been found that the dilution of the resin solution has an effect on the particle size of the precipitated aluminum resinate.

The aluminum sulfate solution, as in Example 1, is added to the clear resin solution to precipitate the pigment, and, if desired, the tertiary amine base can be added, as per Example 1, to improve the oil wetting characteristics of the final pigment.

Example 3

A salmon colored pigment can be prepared as in Example 1 by using 4.8 grams of rhodamine 6 GDN Extra in place of the two rhodamine dyes mentioned in that example. This pigment contains 3% dye.

If desired, other rhodamine pigments may be employed in the present invention. For example, the rhodamine dye may be incorporated in other resinous pigments as mentioned above and as described, for example, in U. S. Patent No. 2,498,592.

For purposes of the present description, the following examples will refer to the metal resinate pigments described above.

Example 4

A letter press ink having a yellowish orange color may be formulated as follows:

|  | Grams |
|---|---|
| Long oil alkyd printing ink varnish | 27.0 |
| 2,2' dihydroxy naphthaldazine | 7.3 |
| Pigment as per Example 3 (3% dye) | 7.3 |
| Pigment as per Example 2 (extender) | 5.0 |
| Paste drier (25%) | 3.0 |
|  | 49.6 |

The paste drier contains 12.5% lead acetate, 12.5% manganese resinate and 75% linseed oil. The total pigment comprises about 39% of the ink.

Example 5

A reddish letter press ink may be formulated as follows:

|  | Grams |
|---|---|
| Long oil alkyd printing ink varnish | 27.0 |
| 2,2' dihydroxy naphthaldazine | 5.6 |
| Pigment as per Example 1 (3% dye) | 17.5 |
| Kerosene | 2.0 |
| Paste drier (25%) (as in Example 4) | 3.0 |
|  | 55.1 |

The pigment comprises about 42% of the ink.

Example 6

A silk screen ink may be prepared by mixing and milling together the following components:

|  | Grams |
|---|---|
| Long oil (soya type) alkyd (50% solids) | 40.6 |
| Aluminum stearate gel | 8.6 |
| Metal naphthenate driers | 0.3 |
| Kerosene | 6.5 |
| 2,2' dihydroxy naphthaldazine | 4.0 |
| Pigment as per Example 1 (3% dye) | 40.0 |
|  | 100.0 |

This screen ink has an intense red color.

Example 7

A brushing and spraying composition may be formulated as follows:

|  | Grams |
|---|---|
| Butyl methacrylate resin (40% solids) | 49.3 |
| V. M & P naphtha | 18.0 |
| 2,2' dihydroxy naphthaldazine | 12.2 |
| Pigment as per Example 1 (3% dye) | 20.5 |
|  | 100.0 |

This composition has an orange color.

Example 8

A paper coating composition may be prepared as follows:

A solution of 80 grams of casein, 10 cc. of ammonium hydroxide in 500 cc. of water is prepared by stirring and heating the mixture until solution is complete.

To this solution is added a mixture of

|  | Grams |
|---|---|
| Glycerine | 120 |
| Butadiene-styrene latex | 664 |
| Anti-foaming agent (sorbitan trioleate) | 28 |
| Pine oil | 6 |
| Trisodium phosphate | 2 |
|  | 820 |

This mixture is stirred into the casein solution until emulsification is complete.

A pigment and latex emulsion is prepared by mixing 2.5 grams of 2,2' dihydroxy naphthaldazine, 7.5 grams of rhodamine pigment as per Example 3 and 20 grams of latex emulsion into 15 cc. of water containing 12 drops of ammonium solution. This emulsion is then added to the casein-latex emulsion and the coating composition thoroughly mixed and stirred to obtain uniformity.

When applied to paper, the coating produced an orange color.

Example 9

A printing composition suitable for use on textile materials may be prepared in the following manner.

10.2 grams of vinyl chloride polymer and 5.7 grams of melamine-formaldehyde resin were dissolved in 46.6 grams of Cellosolve acetate. After solution of the resins, 14.8 grams of a plasticizer, such as dioctyl phthalate, were added. Following this, 10 grams of the salmon pigment as per Example 3 and 12.7 grams of the naphthaldazine were stirred into the solution and milled to effect a thorough dispersion. This printing composition, when applied to a fabric, produced an intense yellowish-orange color.

Although the present invention has been described with particular reference to the examples, it will be understood that various modifications will occur to those skilled in the art, and it is intended that such modifications which come within the scope of the appended claims be covered thereby. It is to be understood that the term "yellow derivatives" as used in the appended claims refers to colored derivatives of 2,2' dihydroxy naphthaldazine in which the color has an appreciable yellow component.

What is claimed is:

1. A fluorescent coating composition comprising a pigment dyed with a rhodamine dye, a compound selected from the group consisting of 2,2' dihydroxy naphthaldazine and yellow derivatives thereof and a vehicle therefor, said compound and said dye being present in the ratio by weight of between about 3.0 to 1 and about 35 to 1.

2. A coating composition as claimed in claim 1 wherein the rhodamine dyed pigment comprises metal resinate pigment particles dyed with a rhodamine dye.

3. An orange fluorescent coating composition comprising a fluorescent rhodamine dyed pigment, 2,2' dihydroxy naphthaldazine and a vehicle therefor, said naphthaldazine and rhodamine dye being present in the ratio by weight of between about 10 to 1 and 35 to 1.

4. A fluorescent coating composition comprising a resinous pigment containing not more than about 3% by weight of a rhodamine dye, a compound selected from the group consisting of 2,2' dihydroxynaphthaldazine and yellow derivatives thereof and a vehicle therefor, said compound and said pigment being present in the ratio by weight of between about 1 to 11 and about 1 to 0.9.

5. A red fluorescent coating composition comprising a transparent resinous pigment dyed with a rhodamine dye which normally exhibits a blue factor, a compound selected from the group consisting of 2,2' dihydroxy naphthaldazine and yellow derivatives thereof and a vehicle therefor, said compound and said dye being present in the ratio by weight of between about 3 to 1 and about 4 to 1.

6. A fluorescent coating composition as claimed in claim 5 wherein the rhodamine dyed pigment contains about 3% by weight of rhodamine and the ratio by weight of the compound to the dyed pigment is between about 1 to 11 and about 1 to 8.

7. A fluorescent ink comprising a resinous pigment dyed with a rhodamine dye, a compound selected from the group consisting of 2,2' dihydroxy naphthaldazine and yellow derivatives thereof, and an ink vehicle therefor, the amount of pigment and compound employed comprising from about 30% to about 60% of the ink, said compound and said dye being present in the ratio by weight of between about 3.0 to 1 and about 35 to 1.

8. A coating composition for use as a silk screen ink comprising a resinous pigment containing about 3% of a rhodamine dye, 2,2' dihydroxy naphthaldazine, an oil modified alkyd resin binder and a volatile vehicle therefor, said naphthaldazine and rhodamine dyed pigment being present in the ratio by weight of between about 1 to 11 and about 1 to 0.9.

9. A fluorescent printing ink composition comprising a resinous pigment dyed with a rhodamine dye, a compound selected from the group consisting of 2,2' dihydroxy naphthaldazine and yellow derivatives thereof, and a vehicle comprising a printing ink varnish, the amount of pigment and compound employed comprising from about 30% to about 60% of the ink, said compound and said dye being present in the ratio by weight of between about 3.0 to 1 and about 35 to 1.

References Cited in the file of this patent

UNITED STATES PATENTS

| | | |
|---|---|---|
| 2,113,090 | McKeag | Apr. 5, 1938 |
| 2,440,070 | Blout | Apr. 20, 1948 |
| 2,464,128 | Gearhart | Mar. 8, 1949 |
| 2,498,592 | Switzer | Feb. 21, 1950 |
| 2,653,109 | Switzer | Sept. 22, 1953 |

FOREIGN PATENTS

| | | |
|---|---|---|
| 728,303 | Germany | Nov. 25, 1942 |
| 1,064,955 | France | Dec. 30, 1953 |